Sept. 18, 1934.　　　　I. E. McCABE　　　　1,973,925

ELECTRICALLY ACTUATED CONTROLS

Filed Jan. 12, 1931　　　2 Sheets-Sheet 1

INVENTOR
IRA E. McCABE
BY Langdon Moore
ATTORNEY

Sept. 18, 1934.  I. E. McCABE  1,973,925
ELECTRICALLY ACTUATED CONTROLS
Filed Jan. 12, 1931  2 Sheets-Sheet 2
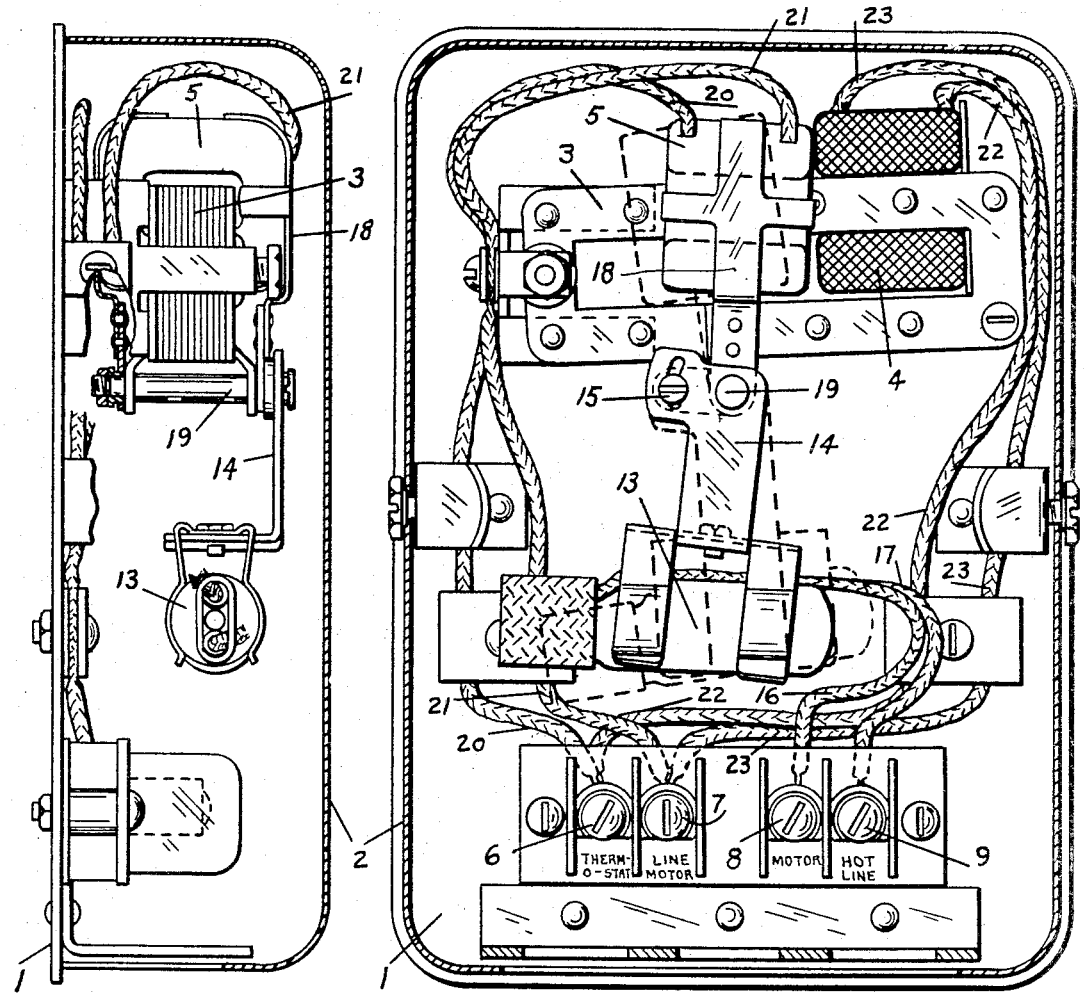
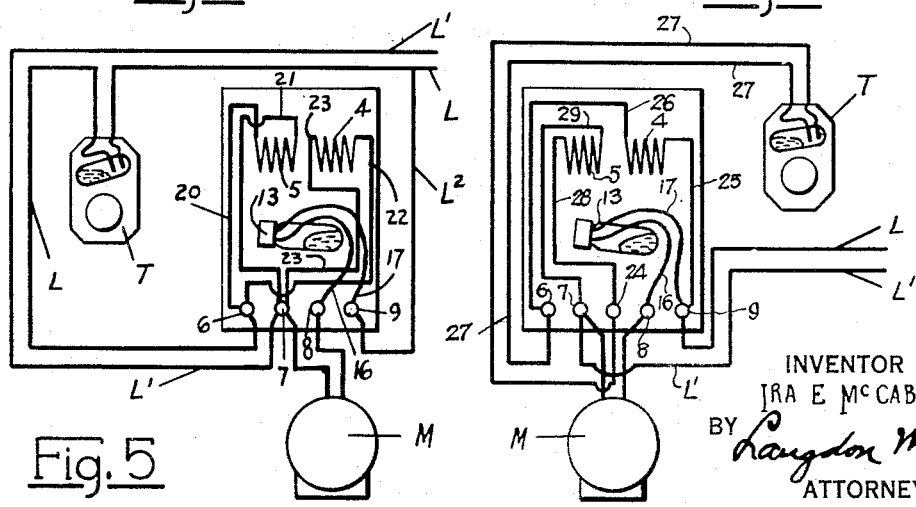
INVENTOR
IRA E. McCABE
BY Langdon Moore
ATTORNEY Patented Sept. 18, 1934

1,973,925

UNITED STATES PATENT OFFICE 1,973,925

ELECTRICALLY ACTUATED CONTROLS

Ira E. McCabe, Chicago, Ill.

Application January 12, 1931, Serial No. 508,185

16 Claims. (Cl. 175—375)

This invention relates to improvements in electrically actuated controls for the operation of switches, valves, and various types of electrically operated equipment or the performance of other physical work and more particularly to a control of this character which is in circuit with the commercial line and functions upon the passage or discontinuance of the commercial current therethrough irrespective of its character, that is, whether the commercial current be direct current or alternating current.

It is an object of this invention to apply the principle that coils of wire freely wound about an iron core upon the passage of an electric current through the coils either attract or repel the coils, according to direction this current passes through the respective windings, and cause such movement to perform physical work. The applicant's prior copending application, Serial No. 500,747 filed December 8, 1930, discloses a limited application of this principle in the form of an alternating commercial current relay in connection with a constant current transformer to control the operation of switches, valves, electrically operated equipment of various types, or perform physical work. It is a further object of this invention to provide a control that will operate irrespective of the character of the commercial current in which the commercial current is adapted to pass through both coils and in which the coils may be connected either in series or in multiple with the commercial line.

With these and other objects in view, reference is made to the accompanying sheets of drawings illustrating preferred embodiments of this invention with the understanding that minor detail changes may be made therein without departing from the scope of this invention.

In the drawings:

Figure 3 is a view similar to Figure 1 illustrating each coil independently connected in multiple with the commercial circuit.

Figure 4 is a view in side elevation of Figure 3, with the panel cover in section.

Figure 5 is a schematic diagram, similar to that of Figure 2, illustrating the wiring of the panel of Figure 3 for the same purpose, and Figure 6 is a similar diagram of another form of wiring.

Figure 1:
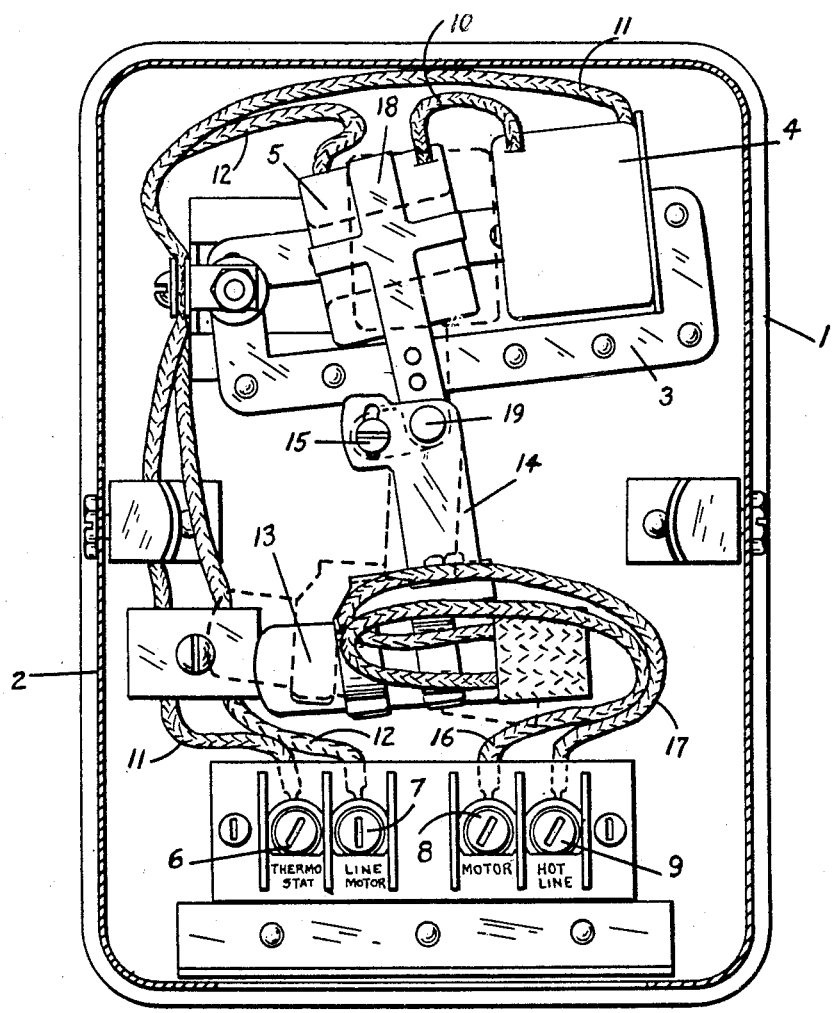
Figure 1 is a view in front elevation of a control panel mounting one form of this invention in which the two coils are connected in series in the commercial circuit, with the panel cover in section.

While the preferred forms of this invention are illustrated in connection with thermostatically controlled motors, such as are customarily employed in domestic fluid fuel burners, it is to be understood that this invention is not restricted to that use alone, inasmuch as it may be used on domestic electric refrigerating units as well as many other automatically controlled devices. A manually operated switch in the commercial line may be substituted for the room thermostat and the movement of the coils may be caused to operate valves, pumps, and other types of electrically operated equipment, or perform other physical work without departing from the scope of this invention.

The embodiment illustrated includes an electric motor M such as employed in connection with domestic fluid fuel burners and a room thermostat T both in circuit with the commercial source of electricity with this improved control in the same circuit between them. The room thermostat may be of any commercial type which closes the commercial circuit when the temperature descends below a predetermined degree and opens the circuit when the temperature reaches or ascends above another predetermined degree. The improved control constructed in accordance with this invention is preferably mounted upon a panel 1, having a removable cover 2, and mounts an iron core 3, of any preferred form either as a bar or as a continuous rectangular core, as shown, or any other desired shape. Separate and independent coils 4 and 5 of wire are wound about the core 3, as shown in Figure 1, the coil 4 being fixed or secured against movement while the core 5 is provided with a central bore which is large enough to permit free longitudinal and a limited angular movement upon the core 3.

Figure 2:
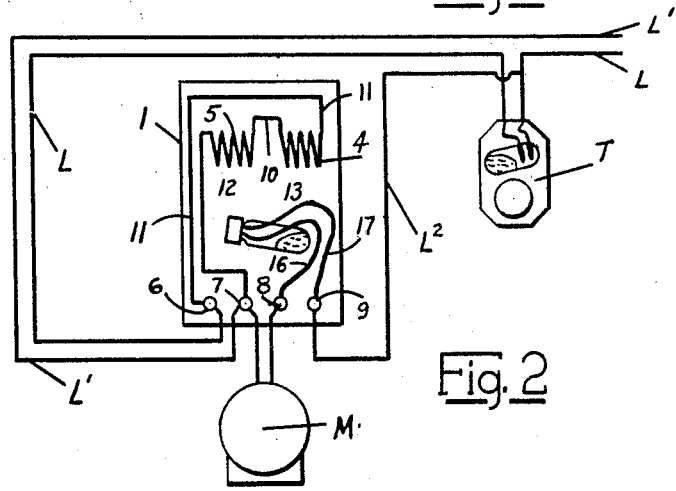
Figure 2 is a schematic diagram illustrating the wiring of the panel of Figure 1 when employed to control the operation of an electric motor upon the opening or closing of a room thermostat.

A series of binding posts are mounted upon the panel of which 6 is connected to the wire L of the commercial line and which passes through the room thermostat T, shown in open position, in Figure 2; post 7 is connected to the other wire L' of the commercial line and also to one pole of the motor M; post 8 is connected to the other pole of the motor M; and 9 is connected by wire L² to the commercial line wire L on the far side of the room thermostat T.

The wires are wound in the same direction in the coils 4 and 5 and their adjacent ends are connected by a flexible lead wire 10. The free end of the winding of coil 4 is connected by wire 11 to binding post 6 while the free end of the winding of coil 5 is connected by a flexible lead wire 12 to binding post 7.

A mercury tube switch 13 is mounted on a pivoted carrying plate 14, having a slotted and adjustable engagement with a stud 15 upon a bracket 18 strapped upon the movable coil 5, and normally carries the switch 13 in open position, as shown in full lines of Figure 1. The respective terminals of the movable mercury tube switch 13 are connected by flexible lead wires 16 and 17 to binding posts 8 and 9, respectively.

From Figure 2, it is seen that the windings of cores 4 and 5 are connected in series through binding posts 6 and 7 to the commercial line wires L and L', so that when room thermostat T completes the circuit through wire L both coils are energized. When both coils are wound in the same direction and are connected as shown, the passage of the line current energizes them and sets up an electrical attraction of one coil for the other. Coil 4 being stationary and coil 5 being movable upon the core 1, the closing of the line circuit causes coil 5 to be pulled or attracted to coil 4 until they engage each other and be held in that position as long as the current passes through both coils. When the current ceases or the circuit is broken coil 5 is no longer attracted and is easily moved away from coil 4. As shown in Figure 1, a bracket 18 is strapped upon movable coil 5 having a portion extending at one side of the core 3 adapted to be connected to the plate 14 and mounted upon the pivot 19 of the carrying plate 14 of the mercury tube switch 13. This plate 14 is so formed, weighted or spring-pressed, that when the room thermostat T is open the plate 14 normally rotates about the pivot 19 to tilt the mercury tube switch into open position and at the same time move coil 5 away from coil 4, as shown in full lines in Figure 1. When the room thermostat closes the circuit therethrough the circuit is completed through coils 4 and 5 and the passage of the current therethrough energizes both coils and causes movable coil 5 to travel from its normal distant position until it engages coil 4 and at the same time through bracket 18 rotates plate 14, as shown in dotted lines in Figure 1, to tilt mercury tube switch 13 to close the circuit from commercial wire L through wire L² to binding post 9, wire 17, switch 13, wire 16, binding post 8, through motor M and binding post 7 to commercial wire L'. As long as the room thermostat T remains closed the commercial current will pass through the coils 4 and 5 holding them together and the switch 13 in the motor circuit closed, causing the motor to operate. Upon the room thermostat T moving to break the commercial line circuit, the coils 4 and 5 are deenergized and the weighted or spring-pressed pivoted carrier plate 14 at once rotates to retract the coil 5 and at the same time to tilt the switch 13 to break the motor circuit and the motor ceases operation.

When the commercial line is 220 volts it is preferable to connect the coils in series as shown and above described, however, for commercial reasons when the commercial line is 110 volts it is preferable to connect the coils 4 and 5 each in multiple with the commercial line, as illustrated in Figures 3, 4 and 5.

In Figures 2, 3, 4 and 5, parts corresponding are indicated by the same reference numerals as in Figures 1 and 2. In Figures 3, 4 and 5, binding post 6 is connected by wire 20 to the nearest end of the winding of coil 5 while the other end of said winding is connected by wire 21 to binding post 7. Binding post 6 is also connected by wire 22 to the most distant end of the winding of coil 4 with the other end of said winding connected by wire 23 to binding post 7. In this manner each coil 4 and 5 is independently energized with the commercial line circuit.

Also, it is to be noted, that the windings are oppositely connected which is equivalent to their each being oppositely wound about the core 3 and when energized will repel each other. In Figures 1 and 2 the coils were wound in the same direction and when energized attracted and therefore the switch carrying plate was pivoted in such a manner as to normally, when the circuit is open, move coil 5 away from coil 4 and tilt the switch 13 to open position. In Figures 3, 4 and 5, it is necessary to so construct, weight or spring press the pivoted switch carrying plate 14 and reverse the position of switch 13 thereon, so that when the line circuit is broken the coil 5 will be moved into contact with coil 4 and the switch 13 tilted into open position.

Referring to Figure 5, it is seen that both switches 13 and the room thermostat T switch are open. Upon closing of the room thermostat the line circuit is completed from wire L to binding post 6 where it branches and part passes through wire 20, coil 5, wire 21 to join the other part passing through wire 22, coil 4, wire 23 at binding post 7 connected to line wire L'. The independently energizing of the coils 4 and 5 set up a repulsion causing switch plate 14 to be rotated to close switch 13 to the motor, which repulsion exists as long as the circuit remains closed. When the room thermostat switch opens the line circuit is broken, the coils 4 and 5 are deenergized, and the weighted or spring-pressed pivoted plate is free to tilt the motor switch 13 to open position, causing the motor to cease operating, and move the coil 5 with engagement with coil 4.

In the wiring of the devices just described the remote control or thermostat T is placed in the commercial line between the source of electricity and the coils of the control. Such an arrangement while not incorrect offers such a condition as subjecting one who comes in contact with the thermostat, should a short circuit occur therein, to the high voltage of the commercial line. Also should the thermostat T be placed in the return line L' instead of the hot line L and the circuit grounded between the thermostat and the control, the control would then be without means of stopping or starting the motor.

To eliminate the possibility of such conditions the control may be wired as shown in Figure 6 in which an additional binding post 24 is required. As shown in the diagram Figure 6, when the thermostat T is closed, the line circuit is completed from wire L through binding post 9, wire 25 to coil 4 and from thence through wire 26 to binding post 6 and by way of wire 27 through thermostat T to binding post 24 and from thence through wire 28, coil 3 and wire 29 to binding post 7 connected to the return commercial line L'. Whereupon the coils are energized and the switch 13 is tilted to close the motor circuit through wires 17 and 18 through binding post 8, motor M and binding post 7.

It is therefore seen that should the circuit in which the thermostat is placed become grounded one of the coils would become deenergized and thus return the mercury tube switch to the open position, as previously explained.

In many cases where safety controls are necessary, such as in domestic fluid fuel burners, positive instant operation is required and it has been found that relays of the electro-magnet type when so employed are not always positive in their operation on account of residual magnetism holding the armature and thereby delaying and, in some cases, preventing the operation of the control. The advantages of this improved control are obvious. It can be employed directly in the commercial line circuit. Does not require a secondary circuit for any purpose. Is operated by direct or alternating current, equally as well in both types. May be connected in series or multiple and is adapted for any commercial line voltage, and may be connected to employ either the force of electrical attraction or electrical repulsion, and takes the place of electro-magnets with clapper armature or solenoids, whereby its operation is not affected or interfered with on account of residual magnetism and, therefore, fully responsive to the opening or closing of the power circuit.

What I claim is:

1. A relay adapted to be included in an electric circuit for operating a tilting mercury tube switch, including an iron core and two coils adapted to be energized by said circuit wound about said core, one being in fixed relation to the core and the other mounted thereon for movement in one direction when both coils are energized and in the opposite direction when one or both coils are deenergized, and means secured to the movable coil and carrying the mercury tube switch to tilt the mercury tube switch when moving in one direction which means returns the coil when deenergized and tilts the mercury tube switch to its respective original position.

2. A relay adapted to be included in an electric circuit including an iron core and two coils wound thereabout and adapted to be connected in said circuit, one in fixed relation thereto and the other mounted for movement thereover in one direction when both coils are energized and in the opposite direction when one or both coils are deenergized, in combination with a mercury tube switch mounted to be tilted about a pivot, and means engaging the movable coil with the switch mounting, whereby the energization of said coil tilts the said mounting to open or close the switch and upon deenergization of the coil the said switch mounting automatically returns the coil to its first position and tilts the said switch to closed or open position.

3. A remote controlled electrically actuated relay adapted to be connected in a control circuit for operating a mercury tube switch to control another circuit, said relay including two coils wound about a magnetic core connected in series in the control circuit, one of said coils adapted to travel over said core, a plate pivoted at one side of the movable coil, attached at one end to said movable coil and mounting the said mercury tube switch on the other side of the pivot and so constructed that the weight of the mercury tube switch normally moves said coil when deenergized to one end of its travel, said switch actuated by the movement of the movable coil when the remote control circuit is opened to open the other circuit, the closing of the remote control circuit closes a circuit through the coils of the relay and energizes said coils to set up an electric repulsion or attraction in accordance with the direction of the respective windings to impart a movement to the movable coil to the other end of its travel and thereby closing the said other circuit through the mercury tube switch and maintaining said switch in the closed position as long as the coils of the relay remain energized.

4. An electrically operated, remote controlled actuating mechanism comprising a fixed iron core around which two coils are wound and connected with a remote control in series with a source of current, one of said coils having one wire connected to one side of the current supply and the other wire connected to the remote control, the other coil adapted to travel over the core having one wire connected to the remote control and the other wire to the other side of the current supply, whereby upon the energization of both coils the movable coil is caused to travel over the core in one direction and upon the deenergization of one or both coils the movable coil by its own weight is caused to travel in the other direction.

5. An electrically operated, remote controlled actuating mechanism comprising a fixed iron core around which two coils are wound and connected with a remote control in series with a source of current, one of said coils having one wire connected to one side of the current supply and the other wire connected to the remote control, the other coil adapted to travel over the core having one wire connected to the remote control and the other wire to the other side of the current supply, whereby upon the energization of both coils the movable coil is caused to travel over the core in one direction and upon the deenergization of one or both coils the movable coil by its own weight is caused to travel in the other direction, and upon grounding or short circuiting either coil the remote control switch is protected from excessive currents as limited by the other coil.

6. An electrically operated, remote controlled actuating mechanism for opening and closing a switch in an electric circuit, comprising a fixed iron core around which two coils are wound, and connected with a remote control in series with a source of current, one of said coils having one wire connected to one side of the current supply and the other wire connected to the remote control, the other coil adapted to travel over the core having one wire connected to the remote control and the other wire to the other side of the current supply, whereby upon the energization of both coils the movable coil is caused to travel over the core in one direction and upon the deenergization of one or both coils the movable coil is caused to travel in the other direction, and a switch for an electric circuit, said switch carried by means secured to the movable coil and normally positioning said coil against the other coil, said means coacting with and by the movement of the movable coil to open and close the switch.

7. An electrically operated, remote controlled actuating mechanism for opening and closing a switch in an electric circuit, comprising a fixed iron core around which two coils are wound and connected with a remote control in series with a source of current, one of said coils having one wire connected to one side of the current supply and the other wire connected to the remote control, the other coil adapted to travel over the core having one wire connected to the remote control and the other wire to the other side of the current supply, whereby upon the energization of both coils the movable coil is caused to travel over the core in one direction and upon the deenergization of one or both coils the movable coil is caused to travel in the other direction, and a switch for an electric circuit, said switch carried by means secured to the movable coil normally positioning said coil away from the other coil, said means coacting with and by the movement of the movable coil to open or close the switch.

8. In a source of power for the operation of a relay or mechanically operated mechanism, a source of current, a circuit thereto including two coils wound about a fixed iron core with one of the coils adapted for movement thereover and normally at rest against the other coil, a control switch connected between the coils by one wire from each coil, and the other wire of one coil connected to one side of the circuit, and the other wire of the other coil connected to the other side of the circuit, whereby the coils and control switch are together in series with the source of current, means providing a connection between the movable coil and the relay or mechanically operated mechanism, and upon closing the control switch the source of power is completely energized and the movable coil is repelled away from the other coil whereby power is transmitted through said means to operate said mechanism.

9. In a source of power for the operation of a relay or mechanically operated mechanism, a source of current, a circuit thereto, including two coils wound about a fixed iron core with one of the coils adapted for movement thereover and normally at rest against the other coil, a control switch connected between the coils by one wire from each coil, and the other wire of one coil connected to one side of the circuit, and the other wire of the other coil connected to the other side of the circuit, whereby the coils and control switch are together in series with the source of current, means providing a connection between the movable coil and the relay or mechanically operated mechanism, and upon closing the control switch the source of power is completely energized and the movable coil is repelled away from the other coil whereby power is transmitted through said means to operate said mechanism in one direction and upon opening the control switch the source of power is deenergized, the movable coil by its own weight returns to rest against the other coil and said means operates said mechanism in the other direction.

10. In a source of power for the operation of a relay or mechanically operated mechanism, a source of current, a circuit thereto including two coils wound about a fixed iron core with one of the coils adapted for movement thereover and normally at rest against the other coil, a control switch connected between the coils by one wire from each coil, and the other wire of one coil connected to one side of the circuit and the other wire of the other coil connected to the other side of the circuit, whereby the coils and control switch are together in series with the source of current, means providing a connection between the movable coil and the relay or mechanically operated mechanism, and upon closing the control switch the source of power is completely energized and the movable coil is repelled away from the other coil whereby power is transmitted through said means to operate said mechanism in one direction and upon opening the control switch the source of power is de-energized, the movable coil by its own weight returns to rest against the other coil and said means operates said mechanism in the other direction and upon grounding or short circuiting either coil the remote control switch is protected from excessive currents as limited by the other coil.

11. In a source of power for the operation of a relay or mechanically operated mechanism, a source of current, a circuit thereto including two coils wound about a fixed iron core with one of the coils adapted for movement thereover and normally at rest away from the other coil, a control switch connected between the coils by one wire from each coil, and the other wire of one coil connected to one side of the circuit, and the other wire of the other coil connected to the other side of the circuit, whereby the coils and control switch are together in series with the source of current, means providing a connection between the movable coil and the relay or mechanically operated mechanism, and upon closing the control switch the circuit to the source of power is completed and the movable coil is attracted to the other coil whereby power is transmitted through said means to operate said mechanism.

12. In a source of power for the operation of a relay or mechanically operated mechanism, a source of current, a circuit thereto including two coils wound about a fixed iron core with one of the coils adapted for movement thereover and normally at rest away from the other coil, a control switch connected between the coils by one wire from each coil and the other wire of one coil connected to one side of the circuit, and the other wire of the other coil connected to the other side of the circuit, whereby the coils and control switch are together in series with the source of current, means providing a connection between the movable coil and the relay or mechanically operated mechanism, and upon closing the control switch the circuit to the source of power is completed and the movable coil is attracted to the other coil whereby power is transmitted through said means to operate said mechanism, in one direction and upon opening the control switch the circuit to the source of power is broken and the movable coil by its own weight returns to its normal position and said means operates said mechanism in the other direction.

13. In a source of power for the operation of a relay or mechanically operated mechanism, a source of current, a circuit thereto including two coils wound about a fixed iron core with one of the coils adapted for movement thereover and normally at rest away from the other coil, a control switch connected between the coils by one wire from each coil and the other wire of one coil connected to one side of the circuit and the other wire of the other coil connected to the other side of the circuit, whereby the coils and control switch are together in series with the source of current, means providing a connection between the movable coil and the relay or mechanically operated mechanism, and upon closing the control switch the circuit to the source of power is attracted to the other coil whereby power is transmitted through said means to operate said mechanism, and upon grounding or short circuiting either coil the remote control switch is protected from excessive currents as limited by the other coil.

14. In the source of power for the operation of a tilting mercury tube switch, a source of current, a circuit thereto including two coils wound about a fixed iron core with one of the coils adapted for movement thereover and normally at rest against the other coil, a control switch connected between the coils by one wire from each coil and the other wire of one coil connected to one side of the circuit and the other wire of the other coil connected to the other side of the circuit, whereby the coils and control switch are together in series with the source of current, means secured to the movable coil and carrying the mercury tube switch, and upon closing the control switch the source of power is completely energized and the movable coil is repelled away from the other coil and said means is operated to tilt the mercury tube switch in one direction, said means coacting with the movable coil upon de-energization of circuit to the source of power to return said coil and the mercury tube switch to their respective original positions.

15. In a source of power for the operation of a tilting mercury tube switch a source of current, a circuit thereto including two coils wound about a fixed iron core with one of the coils adapted for movement thereover and normally at rest away from the other coil, a control switch connected between the coils by one wire from each coil and the other wire of one coil connected to one side of the circuit, and the other wire of the other coil connected to the other side of the circuit, whereby the coils and control switch are together in series with the source of current, means secured to the movable coil and carrying a mercury tube switch, and upon closing the control switch the circuit to the source of power is completed and the movable coil is attracted to the other coil and said means is operated to tilt the mercury tube switch in one direction, said means coacting with the movable coil upon the deenergization of the circuit to the source of power to return said coil and the mercury tube switch to their respective original positions.

16. A mechanism for operating mechanical and electrical apparatus comprising an iron core having bearings on opposite sides of one leg thereof, a bracket supported by a pivot and received by said bearings, said bracket having a pair of arms extending at right angles from the axis of said pivot over opposite faces of said core and a lever extending in the opposite direction of said arms, said lever adapted to actuate the mechanical or electrical apparatus upon movement of the bracket about its pivots and the arms adapted for connection to a source of power to actuate said bracket, said power comprising two coils wound about the leg of said core opposite the pivoted bracket, one of the coils having a connection to the pair of bracket arms and adapted for movement over the leg of the core, a source of current, a circuit thereto including said coils and a power switch in series therewith, said switch having a connection to one wire from each coil and the other wire from one coil connected to one side of the source of current and the other wire of the other coil connected to the other side of the source of current whereby the closing of the power switch completes the circuit through said coils and the bracket supported coil is repelled away from the other coil and the bracket is rotated about its pivot.

IRA E. McCABE.